Nov. 22, 1927. Re. 16,797

F. Y. McKENNEY ET AL

SOAP AND WATER MIXER

Original Filed Aug. 10, 1922

F. Y. McKenney, INVENTOR.
W. H. Cheney,
BY E. P. Bigger
ATTORNEY.

Reissued Nov. 22, 1927. Re. 16,797

UNITED STATES PATENT OFFICE.

FRED Y. McKENNEY AND WILLIAM H. CHENEY, OF CHATTANOOGA, TENNESSEE, ASSIGNORS OF ONE-SIXTH TO MANLY A. WATSON, ONE-SIXTH TO J. A. KELLY, ONE-SIXTH TO J. F. KELLY, ONE-SIXTH TO G. L. ROBINSON, ONE-TENTH TO R. E. ROBINSON, JR., AND SEVEN-THIRTIETHS TO JACKSON ZINN EASLEY.

SOAP AND WATER MIXER.

Original No. 1,486,100, dated March 4, 1924, Serial No. 580,868, filed August 10, 1922. Application for reissue filed July 3, 1924. Serial No. 724,055.

Our said invention relates to apparatus for use in obtaining a soap solution, or a mixture of soap and water, by directing a supply of water into a supply of soap so that the water will act to dissolve the soap and become mixed therewith to form a solution, and it consists in a construction of such an apparatus and an arrangement of its parts whereby such solution may be readily and rapidly secured. While said apparatus is intended primarily for thus obtaining soap solutions, or mixtures, to be used for all cleansing and washing purposes for which soap is employed, yet it is capable of use with other materials for other purposes, as will be readily understood.

It is also an object of our invention to provide such an apparatus by which the proportions of soap and water may be readily varied and positively regulated so as to produce a solution of a predetermined strength, or predetermined soap content, such as may be adapted for the particular purpose for which the solution produced is intended.

Another object of the invention is to provide such an apparatus by the use of which the soap will be thoroughly dissolved in the water before reaching the point of use, so that no small undissolved particles of the soap will be present in the solution, thus avoiding the disadvantages common to other devices of this character.

This and various other objects and advantages, which will be appreciated by those skilled in the art whereby an apparatus of the character described is provided which is adapted for ready connection with a source of supply of water, of a comparatively inexpensive construction and efficient in operation, characterize our said invention.

Figure 1:
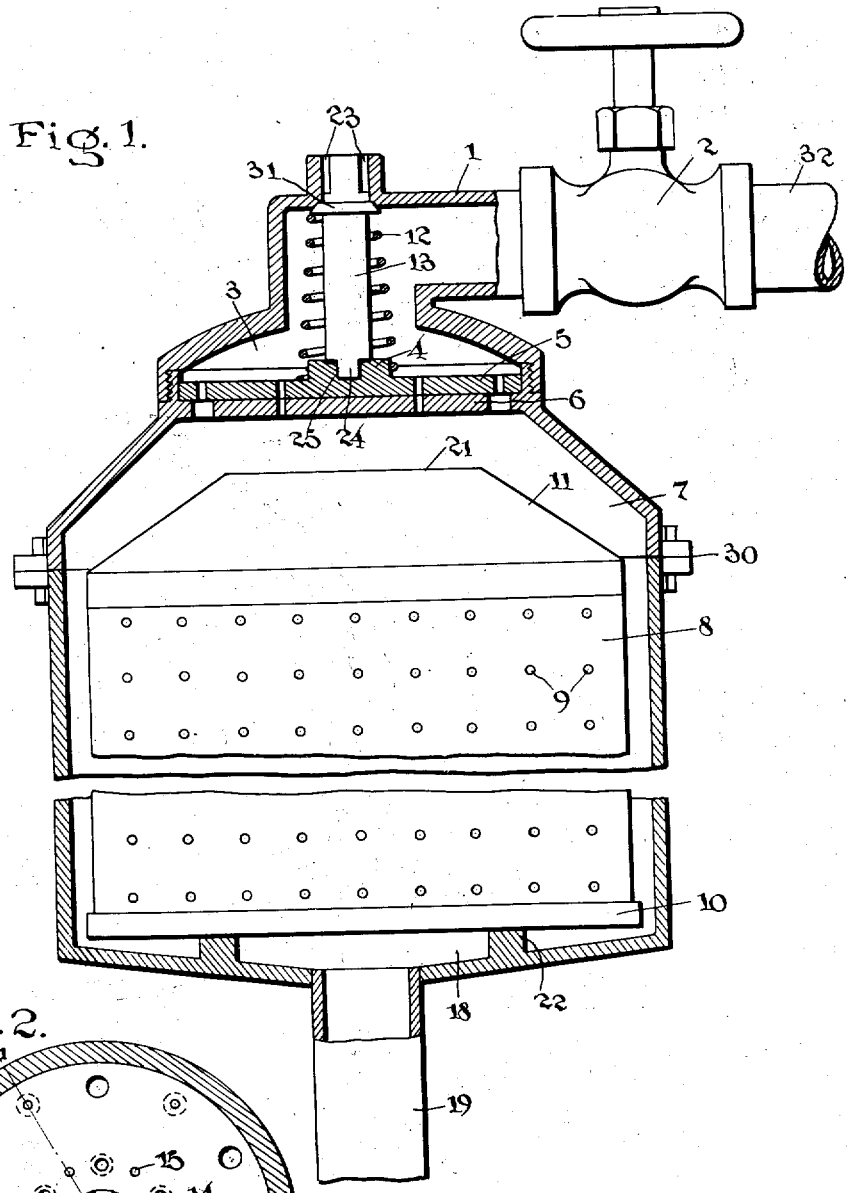
Figure 2:
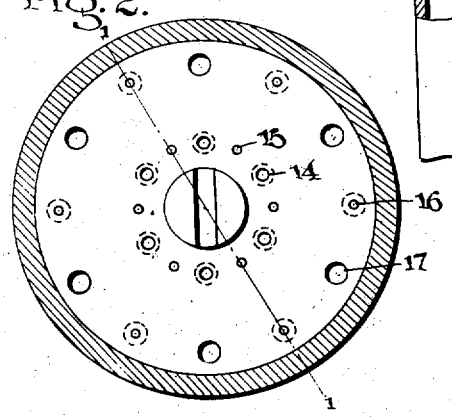

Referring to the accompanying drawings, which are made a part hereof and on which similar reference characters indicate similar parts, Figure 1 is a vertical section on line 1—1 of Figure 2 through an apparatus of the character described embodying our said invention, and Figure 2, a top plan of the valve used therein for controlling the volume of water.

In the drawings reference character 1 indicates the inlet neck of the apparatus which may be secured to a water pipe 32 having a valve 2 for controlling the supply of water to the upper end of the apparatus. The upper end of the casing forms a chamber 3 in which is interposed a plate 6 perforated for the passage of water. Adjacent the plate 6 is mounted a plate or valve 5 of appropriate form to regulate the flow of water. In the form shown it consists of a disk having perforations adapted, when turned to proper position, to register with those of plate 6. Such a valve, however, is not essential to the leading function of the apparatus but only to its use when the strength of the soap solution is to be varied.

As best shown in Figure 2 the perforations in the two plates are of two sizes, the upper plate having small perforations 16 and large perforations 17 arranged near its outer edge while the lower plate has a smaller number of perforations all of which are large. The upper plate also has large perforations 14 and small perforations 15 arranged in a circle near the middle of the plate and the lower plate has a smaller number of perforations to register with perforations 14 and 15, those in the bottom plate being larger than those of either set in the corresponding circle on the upper plate for the purpose among others of insuring registration with the smaller passages in the upper plate. In the present embodiment of the invention the large and small perforations are shown as arranged alternately in the respective circles so that the rotation of the plate 5 may vary the flow of the water by registering large perforations in the one plate with either large or small perforations in the other plate, or more or less area of the perforations in the respective plates. Other forms of valve devices adapted to accomplish the regulation of flow will readily suggest themselves to those skilled in the art and we therefore desire to have it understood that we do not limit our invention to the particular form shown, or to the arrangement of the perforations, as any suitable arrangement, other than that shown, may be employed.

The plate 5 has a boss 4 on its upper side in which is a transverse notch 25. The valve stem 13 has a fin 24 fitting in the notch and near its upper end has an annular shoulder 31 bearing against the inner surface of the casing surrounding the opening forming the bearing for the upper end of said stem. A spring 12 rests at its lower end on plate 5 and at its upper end bears against the under face of shoulder 31 to maintain a close contact between the shoulder and the opposing surface and also maintain the plate in close frictional contact. The upper end 23 of the valve stem is formed to be engaged by a key, or other appropriate operating device. It will be understood, of course, that any appropriate means for operating the valve and securing it in any desired position may be used, that shown being only one means for such purpose, which will readily suggest themselves to one skilled in the art.

The main chamber 7 is of any preferred form or size, here shown as cylindrical. Mounted therein is a soap holder 8 consisting essentially of two parts, here shown with a cylindrical body spaced from and concentric with the casing 7 though it may be of any other desired form and may or may not be concentric according to the arrangement of the valve above it and other considerations. The body of said soap holder has a number of perforations 9 through its walls arranged at different heights about the same. Its bottom may or may not have perforations and is shown as resting on lugs 22 which space it from the bottom of the mixing tank or chamber and which are spaced from each other. The upper end of the soap holder is provided with a top or cap 11, in this instance having the shape of a frustum of a cone. Said cap has a flange 30 which fits over the top of the body and is open at the upper end at 21 underneath the inner circle or any predetermined number of holes in the plate 6. An outlet 19 adapted for connection with a discharge nozzle, or a pipe to conduct the soap solution to the point of use, is provided in the bottom of chamber 7.

The operation of said invention is as follows: The apparatus is installed by being attached as indicated in Figure 1 to a water supply pipe 32. The soap container 8 is filled, or partially filled, with soap of any desired character, either solid or semi-solid in its nature. The cap or cover 11 is adjusted to position and the water turned on by means of the valve 2. The water going through the perforations in plate 6 within the circle of the opening 21 passes into the top of the container, flows over the top of the soap or through the soap, forming a soap solution which flows through perforations 9 into the space between the soap container and the walls of the chamber 7, the solution passing down and out through outlet 19 which is connected to a pipe or nozzle by which the solution is conducted to the point where it is to be used. By the use of the valve 5 the volume of water passing into the soap container may be regulated as has been heretofore described so that a greater or less soap content will be contained in the solution passing out from the outlet. It is very desirable in many instances to have such means of regulating the soap content as different strengths of solution are desirable for different uses, and by this means just the character of solution required in this respect may be provided for every purpose. The water flowing through the outer circle or line of perforations, flows upon the outer surface of the inclined top 11 and passes down over the outer wall of the soap container, keeping the soap container washed free of soap content and adding water to the soap solution as may be required. If it appears desirable to provide for a supply of clear water; e. g., for rinsing, the perforations may be so arranged that the valve 5 can be adjusted so as to close the perforations above the open top of the container and leave open only the openings in the outer circle so that water will fall only upon the outside of the soap container and flow down and out through the outlet 19 without mingling with the soap.

By this means an apparatus of the character described is provided which is capable of a variety of uses and may be regulated to produce just the strength of solution desired for any particular use.

One of the main advantages of my device is that by its use a solution can be made which will be absolutely uniform for all practical purposes from the beginning of the operation until practically the very last of the cake or mass of soap is dissolved. Among other reasons this is true because the water falls in uniform volume and at uniform pressure (except as the pressure is adjusted by valves 2 and 5 to change the soapiness or soap content of the solution), and falls on a surface of uniform area at all times. The water or more properly the solution of soap and water flows off at once so that the mass of soap is neither softened by water standing thereon nor does a blanket of water protect the soap against the action of the water, as would be the case if the perforations did not extend all the way down the sides.

The inventors are aware of Patent No. 623,851, to Van Riper and do not claim the invention there disclosed but they do claim to be the first to cause water to flow over a solid (continuous) block or mass of either hard, soft or semi-solid soap in a manner to produce a uniform solution, instead of percolating through a granular mass of material as in the patent mentioned.

It will be understood, of course, that the apparatus as illustrated is only of a form which has been found desirable in actual use but may be varied in detail in many respects without departing from the spirit or purpose of our invention. For example, the soap container may be woven wire or other reticulated material and water may be diverted to flow outside the soap container by other means than the inclined top and the open top of the container may be covered by reticulated material to break up the falling water into fine streams or spray.

Having thus fully described our said invention, what we claim as new and desire to secure by Letters Patent is:

1. An apparatus of the character described comprising a chamber having a water inlet at one end and an outlet for the solution at the other, a container for soluble material with an open top and a perforated enclosing wall mounted within said chamber, and means for directing part of the water from the inlet end into the soap container and part of it outside of said enclosing wall, substantially as set forth.

2. In an apparatus of the character described, the combination of a chamber, a soap holder therefor having perforated sides, an inlet passage for liquid above the holder, means to cause part of the liquid entering the chamber to pass down the outer wall of the holder and another part to fall on the soap in the holder, means for varying the proportions of liquid passing into and around the holder, and a discharge outlet, substantially as set forth.

3. An apparatus of the character described, comprising a chamber, a soap holder therein having perforated sides and an opening at the upper end, an inlet for water in the upper part of the chamber, adjustable means whereby varying proportions of the water entering the chamber may be caused to pass around the holder and through said opening into the holder, and a discharge outlet, substantially as set forth.

4. An apparatus of the character described, comprising a chamber, a soap holder therein having perforated sides and an opening at the upper end, a water inlet in the upper part of the chamber, a fixed plate between the holder and the inlet having inner and outer series of perforations, a rotatable plate in face contact with the fixed plate having perforations adapted to register with those of the first in varying ratios as the rotatable plate is moved, whereby varying proportions of the inflowing water pass around the holder and into said opening respectively, substantially as set forth.

5. An apparatus of the character described, comprising a chamber with an outlet, a soap holder therein having perforated sides and an opening at the upper end, an inlet for water in the upper part of the chamber, a fixed plate between the holder and the inlet having perforations above the opening at the top of the holder and other perforations laterally spaced from said opening, and a rotatable plate in face contact with the fixed plate having perforations adapted to register with those of the fixed plate in varying ratios in different relative positions of the plates whereby different proportions of the water may be caused to pass into and around said holder, substantially as set forth.

6. An apparatus of the character described, comprising a chamber with an outlet, a soap holder therein having perforated sides and an opening at the upper end, an inlet for water in the upper part of the chamber, a fixed plate between the holder and the inlet having perforations above the opening at the top of the holder and other perforations laterally spaced from said opening, and a rotatable plate in face contact with the fixed plate having perforations adapted to register with those of the fixed plate in varying ratios in different relative positions of the plates whereby different proportions of the water may be caused to pass into and around said holder, and key-controlled means for rotating the plate, substantially as set forth.

7. An apparatus of the character described, comprising a chamber, an open-topped soap holder therein having perforated sides, a water inlet above the holder, a valve for directing part of the water into the open top of the holder and part around the holder, and a common outlet passage for all the water, substantially as set forth.

8. An apparatus of the character described, comprising a chamber with an outlet, an open-topped soap holder therein having perforated sides, a water inlet above the holder, and a valve for directing part of the water into the open top of the holder and part around the holder, substantially as set forth.

9. An apparatus of the character described, comprising a chamber with an outlet, an open-topped soap holder therein having perforated sides, a water inlet above the holder, a fixed perforated plate above the holder, a rotatable perforated plate in face contact therewith, a stem for the valve extending through the wall of the chamber and formed to receive a key for rotating the valve to vary the registry of the perforations whereby different proportions of the water are caused to pass into and around said holder, substantially as set forth.

10. An apparatus of the character described, comprising a chamber with an outlet, an open-topped soap holder therein having perforated sides, a water inlet above the holder, a fixed perforated plate above the holder, a rotatable perforated plate in face contact therewith, a stem for the valve extending through the wall of the chamber and formed to receive a key for rotating the valve to vary the registry of the perforations whereby different proportions of the water are caused to pass into and around said holder, and a spring about the valve stem for pressing the rotatable plate against the fixed plate, substantially as set forth.

11. A solution apparatus comprising a fixed chamber having inlets for water, an upright container therein for soluble material formed with an open top disposed below and in the direct line of flow from one or more of said inlets, the sides of said container having perforations at intervals from top to bottom, said container being mounted within said chamber and spaced from the walls thereof, and means in the casing for regulating the proportions of water simultaneously discharged into and outside of said container; said means including an operating element accessible outside the casing, substantially as set forth.

12. A solution apparatus comprising a casing, a holder therein for soluble material, said holder having perforated sides, a frusto-conical cover for the holder open at the smaller end, and means for admitting fluid into the casing said means being arranged to discharge partly into the opening of the holder and partly on the sloping surface of the cover, substantially as set forth.

13. A solution apparatus comprising a casing, a holder therein for soluble material, said holder having perforated sides, a frusto-conical cover for the holder open at the smaller end, means for admitting fluid into the casing said means being arranged to discharge partly into the opening of the holder and partly on the sloping surface of the cover, and means for varying the proportions of fluid discharged into the opening and on said surface respectively, substantially as set forth.

14. A solution apparatus comprising a casing, a holder therein for soluble material, said holder having perforated sides, a frusto-conical cover for the holder open at the smaller end, one or more inlet passages for liquid in line with the opening of the cover discharging directly on said soluble material, and one or more inlet passages discharging on the sloping wall of the cover whereby the liquid from the latter passages washes the outer walls of the holder, substantially as set forth.

15. In an apparatus of the character described the combination of a chamber, a soap holder therein having perforated sides, an inlet passage for liquid above the holder, means to cause part of the liquid entering the chamber to pass down the outer wall of the holder and another part to fall on the soap in the holder, and a discharge outlet, substantially as set forth.

16. In a soap mixer, a casing for attachment to a faucet, means in the casing for supporting a mass of soap, means for directing a spray of water on an exposed surface of said mass, means for carrying off the resulting solution so proportioned to the entering spray of water as to leave said surface naked to the impact of the water at all times, and means independent of the faucet to vary the quantity of water discharged per unit of time, substantially as set forth.

17. A solution apparatus for attachment to a faucet comprising a casing, a soap-container beneath the faucet said container being open at the top and having sides perforated from top to bottom to permit the solution to flow off as fast as formed, and means on the apparatus independent of the faucet whereby the flow of water may be varied, substantially as set forth.

18. A solution apparatus for soap comprising a soap-receiving chamber of uniform size from top to bottom defined by a single continuous side wall and an imperforate bottom, said side wall having perforations of uniform size uniformly spaced from top to bottom, a casing for attachment in a depending position to a spigot, means for supporting the chamber in spaced relation to the sides and bottom of the casing, and an outlet passage in said bottom, substantially as set forth.

In witness whereof, we have hereunto set our hands at Chattanooga, Tennessee, this 31st day of May, 1924.

FRED Y. McKENNEY.
WILLIAM H. CHENEY.